US007862102B1

(12) United States Patent
Benton

(10) Patent No.: US 7,862,102 B1
(45) Date of Patent: Jan. 4, 2011

(54) APPARATUS FOR REDUCING DRAG ON VEHICLES

(76) Inventor: Craig R. Benton, 301 W. Granada, Phoenix, AZ (US) 85003

(*) Notice: Subject to any disclaimer, the term of this patent is extended or adjusted under 35 U.S.C. 154(b) by 828 days.

(21) Appl. No.: 11/653,536

(22) Filed: Jan. 16, 2007

(51) Int. Cl.
*B60J 9/04* (2006.01)

(52) U.S. Cl. .................................................... 296/180.1

(58) Field of Classification Search ... 296/180.1–180.5, 296/181.5; 180/903
See application file for complete search history.

(56) References Cited

U.S. PATENT DOCUMENTS

| | | | | |
|---|---|---|---|---|
| 1,714,609 | A | 5/1929 | Massey | |
| 1,913,169 | A | 6/1933 | Martin | |
| 2,938,680 | A | 5/1960 | Greene et al. | |
| 3,178,131 | A | 4/1965 | Liang | |
| 3,455,594 | A | 7/1969 | Hall et al. | |
| 3,791,468 | A | 2/1974 | Bryan, Jr. | |
| 3,951,445 | A * | 4/1976 | Tatom | 296/180.3 |
| 3,960,402 | A | 6/1976 | Keck | |
| 3,999,797 | A | 12/1976 | Kirsch et al. | |
| 4,320,920 | A | 3/1982 | Goudey | |
| 4,379,582 | A | 4/1983 | Miwa | |
| 4,458,937 | A * | 7/1984 | Beckmann et al. | 296/180.3 |
| 4,462,628 | A * | 7/1984 | Gregg | 296/180.3 |
| 4,810,022 | A | 3/1989 | Takagi et al. | |
| 4,976,349 | A | 12/1990 | Adkins | |
| 5,199,762 | A * | 4/1993 | Scheele et al. | 296/180.1 |
| 5,280,990 | A * | 1/1994 | Rinard | 296/180.1 |
| 6,045,095 | A | 4/2000 | Parrish, IV | |
| 7,192,077 | B1 * | 3/2007 | Hilleman | 296/180.1 |
| 7,484,791 | B1 * | 2/2009 | Chen | 296/180.5 |
| 2004/0256885 | A1 | 12/2004 | Bui | |
| 2007/0228772 | A1 * | 10/2007 | Froeschle et al. | 296/180.1 |

FOREIGN PATENT DOCUMENTS

| | | |
|---|---|---|
| WO | WO92/19485 | 11/1992 |

* cited by examiner

*Primary Examiner*—H Gutman
(74) *Attorney, Agent, or Firm*—Arent Fox LLP

(57) ABSTRACT

An apparatus for reducing the drag on a moving vehicle includes combinations of a movable diverter with a corresponding fixed diverter. Each combination is adapted to be mounted the rear of a vehicle with the fixed diverter positioned forward of the movable diverter. The movable diverter has a retracted position and an extended position and is biased to the retracted position. The movable diverter deploys to the extended position when moving above a predetermined velocity and returns to the retracted position when moving below the predetermined velocity. The movable diverter in the extended position having the rear end extending over the rear of a vehicle to direct air thereto.

4 Claims, 4 Drawing Sheets

APPARATUS FOR REDUCING DRAG ON VEHICLES

TECHNICAL FIELD

This invention relates generally to the field of atmospheric drag reduction, and, more particularly, to an apparatus for reducing drag on vehicles such as trucks, trailers, trains and the like.

BACKGROUND OF THE INVENTION

When a vehicle moves, a low pressure area forms at the rear thereof which results in increased drag. This increased drag forces the engine of the vehicle to work harder and thus, reduces mileage. The increased drag is often aggravated by the shape of the vehicle. For example, the squared off end of a semi trailer causes far more drag than the rounded ends of a sports car.

Thus, there is a need to reduce the increased drag caused by the low pressure area created behind a moving vehicle.

There have been a number of drag reducing devices described in the art. For example, U.S. Pat. No. 5,280,990 entitled "Vehicle Drag Reduction System" which issued on Jan. 25, 1994 to Rinard describes fixed position mounted vanes to direct air to the rear of a semi-tractor trailer. Similar devices are found in U.S. Pat. No. 3,999,797 entitled "Airvane Device for Bluff Vehicles and the Like" which issued on Dec. 28, 1976 to Kirsch et al. and U.S. Pat. No. 3,960,402 entitled "Vehicle Flow Direction Vanes" which issued on Jun. 1, 1976 to Keck.

U.S. Patent Application No. US2004/0256885 entitled "Rear Spoiler With Motorized Vertical and Angle Adjustability" which published on Dec. 23, 2004 to Bui provides an adjustable rear spoiler which comprises a wing-like mechanism for trucks, has electric motor actuator transmitting rotational motion to worm gear box assembly, and has wing unit and wing mounting brackets attached to upper linkage supports to create pivotal angle adjustments.

U.S. Pat. No. 6,045,095 entitled "Vane-Airfoil Combination" which issued on Apr. 4, 2000 to Parrish, IV shows a vane-airfoil combination which comprises a rotating set of vanes located in front of the leading edge of the airfoil assembly.

WIPO Application No. WO92/19485 entitled "Vehicle Streamlining Device for Pressure Drag Reduction" which published on Nov. 12, 1992 to Eliahou discloses a device for diverting air at rear of trailer which comprises a flap for streamlining a vehicle to reduce drag. The flap is raised or lowered by actuator connected to vehicle speedometer.

U.S. Pat. No. 1,714,609 entitled "Airplane" which issued on May 25, 1928 to Massey has a dual airfoil for vehicles which comprises a pair of airfoils that provide lift and have forward and rear positions and the forward is located above the second while the second is located to the rear and lower than the first.

U.S. Pat. No. 1,913,169 entitled "Wing and Like Member for Aircraft" which issued on Jun. 6, 1933 to Martin provides a combination triple airfoil for vehicles which comprises three airfoils that provide lift and reduce drag and have staggered positions relative to one another.

U.S. Pat. No. 4,810,022 entitled "Automotive Vehicle With Adjustable Aerodynamic Accessory and Control Therefor" which issued on Mar. 7, 1989 to Takagi et al. shows an adjustable aerodynamic spoiler with controller which has spoiler settings regulated automatically by sensed driving conditions such as vehicle speed, crosswinds and the like.

None of the known prior art disclose the combination set forth herein.

SUMMARY OF THE INVENTION

It is an object of this invention to provide a wind velocity actuated apparatus for reducing drag on vehicles.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
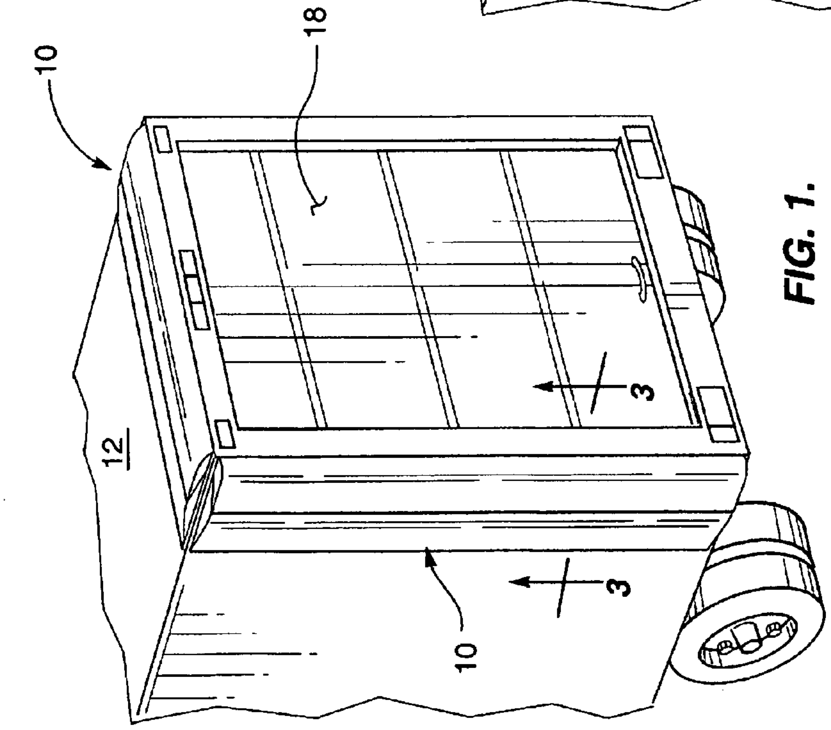
FIG. 1 is a perspective view of the present invention on a semi-tractor trailer in a retracted position.

The invention is an apparatus 10 comprising a combination of movable diverters 16 and fixed diverters 14 mounted on the rear of vehicles 12 such as tractor-trailers, trucks and trains. When vehicle 12 is moving, a low pressure area 18 forms at the rear thereof which results in increased drag. Apparatus 10 diverts air flows to reduce or minimize low pressure area 18 to reduce drag. Each diverter, 14, 16 is mounted proximate to the rear of vehicle 12 along the top and sides thereof.

Figure 3:
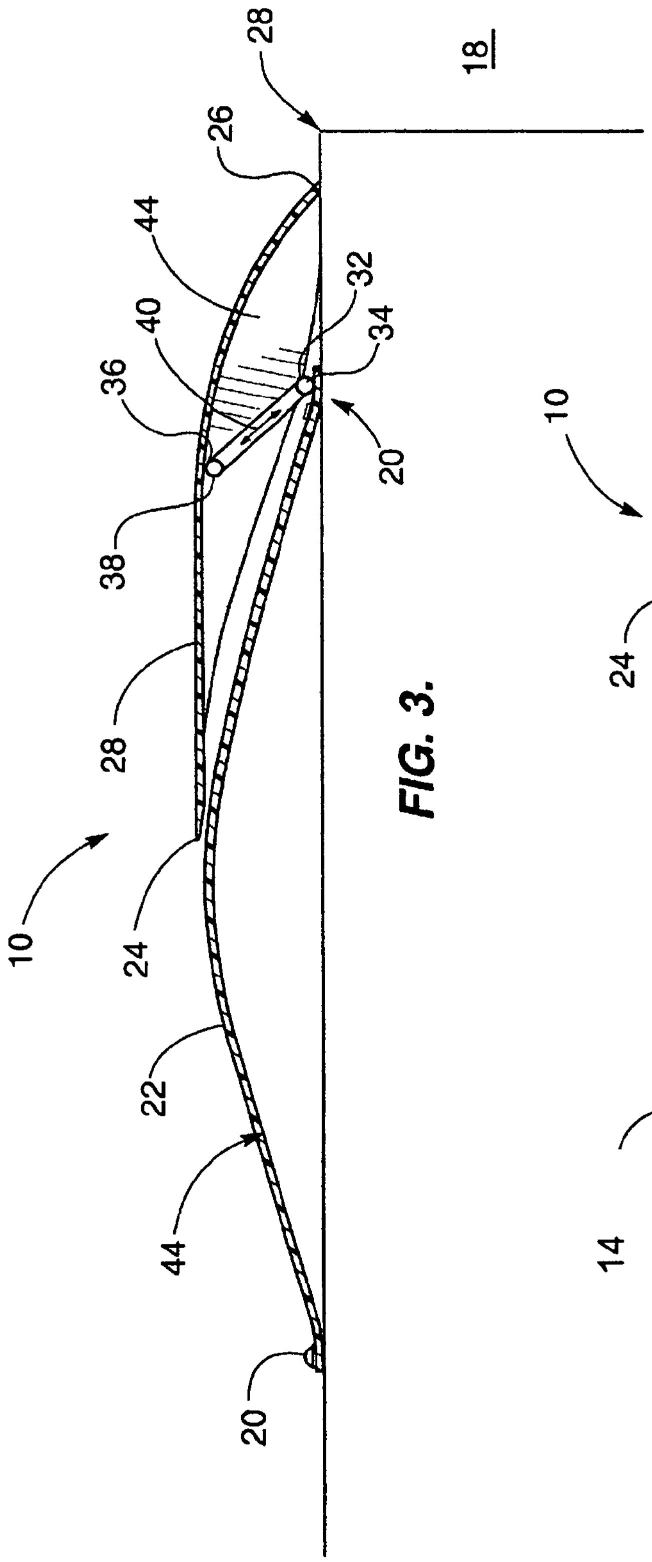
FIG. 3 is a cross sectional top view of the present invention in the retracted position taken along line 3-3 of FIG. 1.
Figure 4:
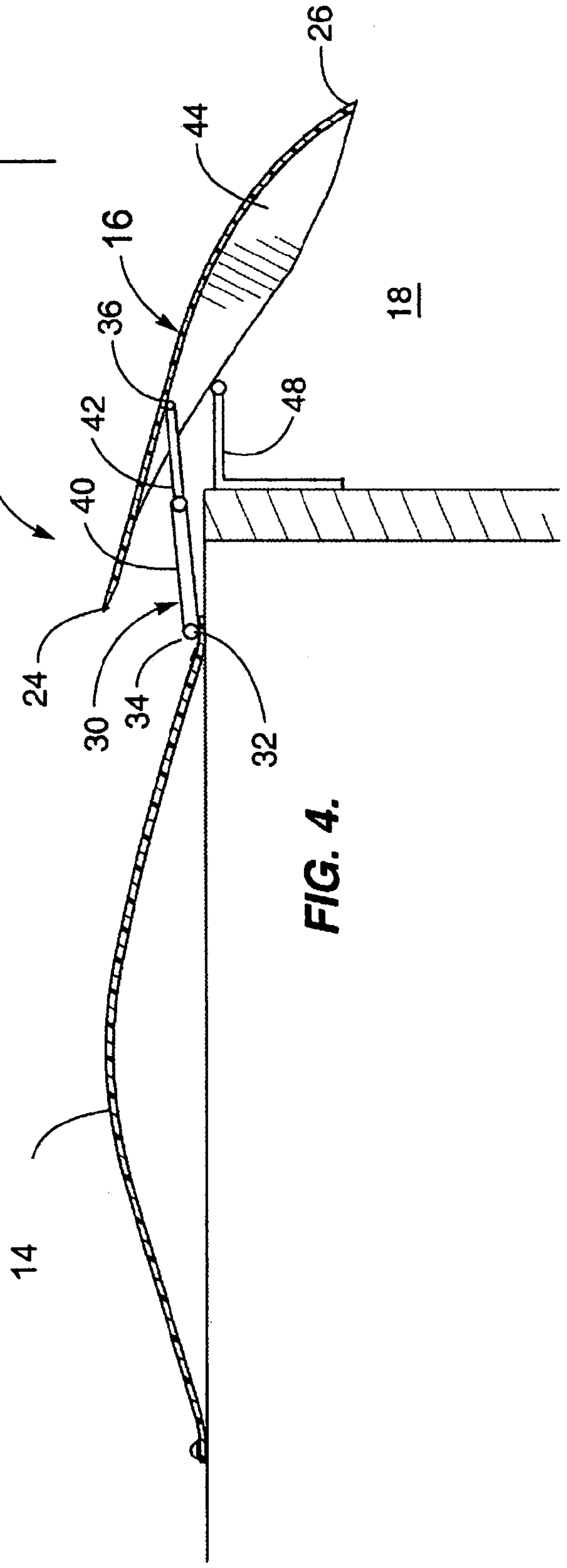
FIG. 4 is a cross sectional top view of the present invention in the extended position taken along line 4-4 of FIG. 1.

Fixed diverter 14 is positioned forward of movable diverter 16. As best seen in FIGS. 3 and 4, fixed diverter 14 has an aerodynamically shaped cross section which curves outwardly from a mount 20 attaching one end to vehicle 12, to a predetermined height 22 from which said fixed diverter curves inwardly to a second mount 20 which attaches the other end to vehicle 12.

Movable diverter 16 has a retracted position seen in FIG. 3 which has a forward end 24 which lays flat on fixed diverter 14 and a rear end 26 which engages a rear corner 28 of the vehicle to essentially provide an extension 28 to the predetermined height 22 to a position closer to the rear of vehicle 12.

Figure 2:
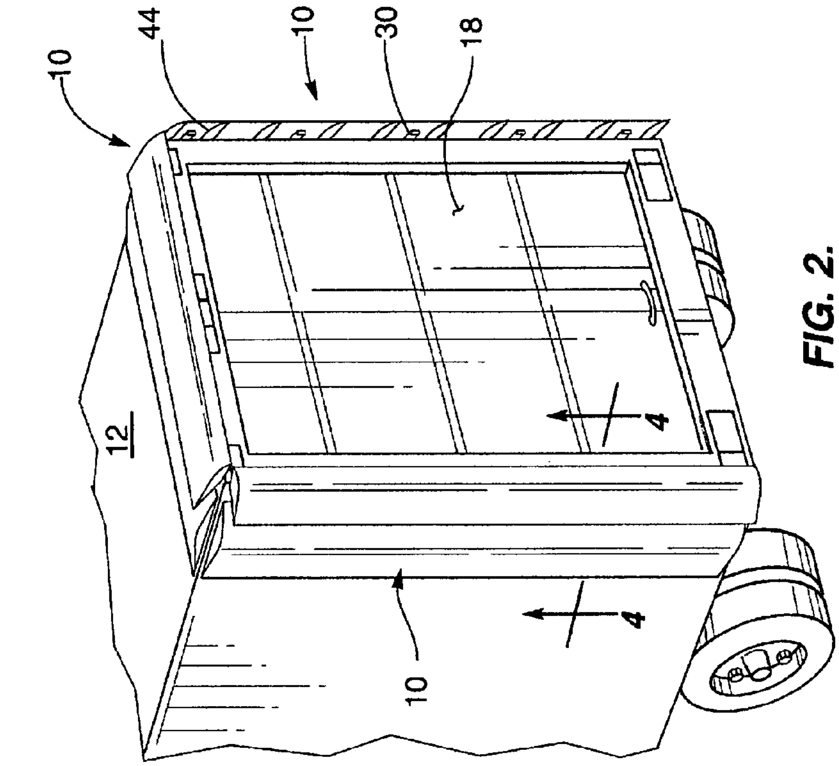
FIG. 2 is a perspective view of the present invention on a semi-tractor trailer in a extended position.

Turning now to FIGS. 2-4, movable diverter 16 deploys when vehicle 12 reaches a set predetermined set velocity, preferably at highway speeds, i.e, most preferably about 60 to 70 miles per hour. Preferably, this deployment is accomplished mechanically by means of deployment device 30. Most preferably, deployment device 30 is a hinge with an internal and integrated slide with springs described in more detail below. Once vehicle 12 drops below the deployment speed, movable diverter 16 returns to the retracted position.

In more detail, when vehicle 12 reaches the predetermined deployment speed, air flow at forward end 24 begins to lift movable diverter 16 away from fixed diverter 14. Movable diverter 16 in the extended position has the forward end 24 separated from and positioned above fixed diverter 14 and the rear end 26 extending over the rear of vehicle 12 to direct air thereto thereby limiting low pressure area 18.

In this embodiment, deployment device 30 comprises a first hinge 32 which attaches device 30 to vehicle 12. First hinge 32 includes a coil spring 34 which biases device 30, and hence movable diverter 16, to the retracted position. A second hinge 36 attaches device 30 to movable diverter 16. Second hinge 36 also includes a coil spring 38 which biases device 30, and hence movable diverter 16, to the retracted position. Coil springs 38 can be of differing spring characteristics to provide for different set velocities for deployment of movable diverter 16. Those skilled in the art will recognize that other mechanisms are certainly useful in changing set velocities as desired.

Those skilled in the art will recognize that the present description is illustrative in nature and not meant to limit the present invention to the springs and hinges described. Other mechanisms, motor driven, electrical, hydraulic can also be used to move the movable diverter between the retracted position and the deployed position.

A piston or slide cylinder 40 allows device 30 to extend to allow movable diverter 16 to curve around the back of vehicle 12 as device 30 rotates. A piston 42 is telescopically received with piston cylinder 40 and is biased, either hydraulically or via springs, to the retracted position of FIG. 3.

In the most preferred embodiment, movable diverter 16 is further equipped with fins 44 extending inwardly towards vehicle 12. Fins 44 reduce turbulence and stabilize the structure, and hence drag, as air moves between movable diverter 16 and vehicle 12.

An extended hinge 48 is provided which allows truck doors, if provided, to open around device 10.

Figure 5:
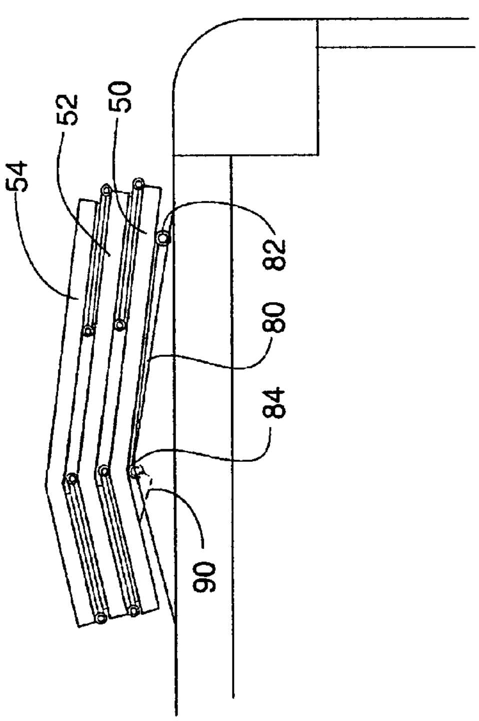
FIG. 5 is a cross sectional top view of an alternate embodiment of the present invention in the retracted position.
Figure 6:
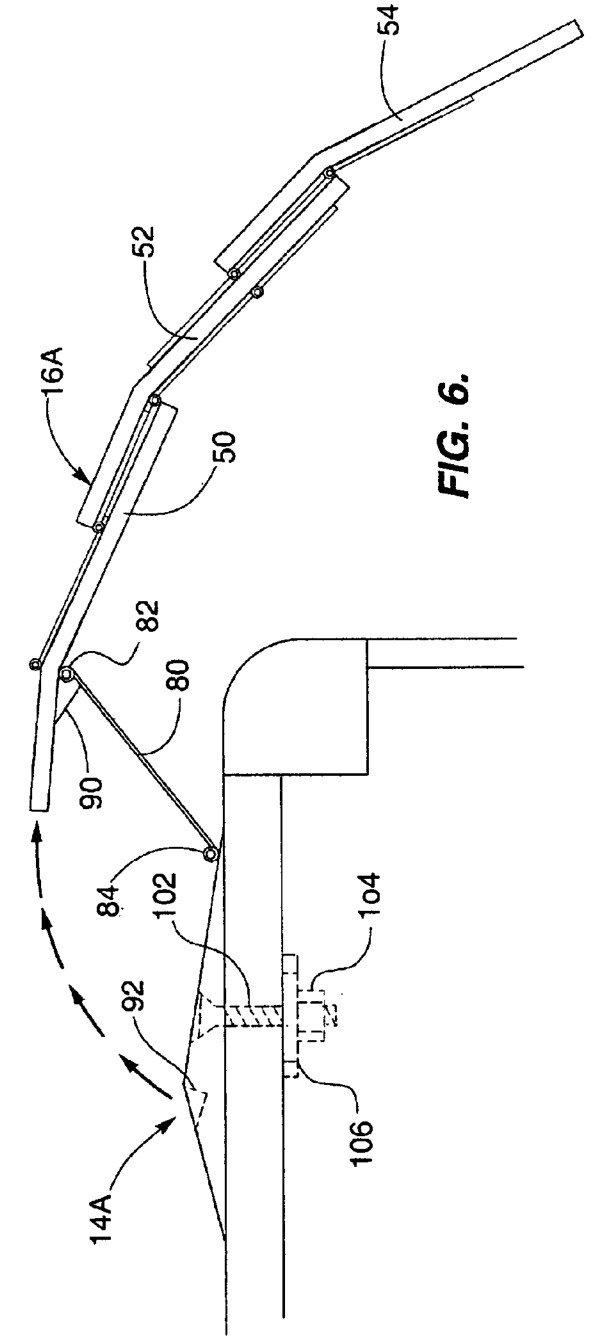
FIG. 6 is a cross sectional top view of the alternate embodiment of FIG. 5 in the extended position.
Figure 7:
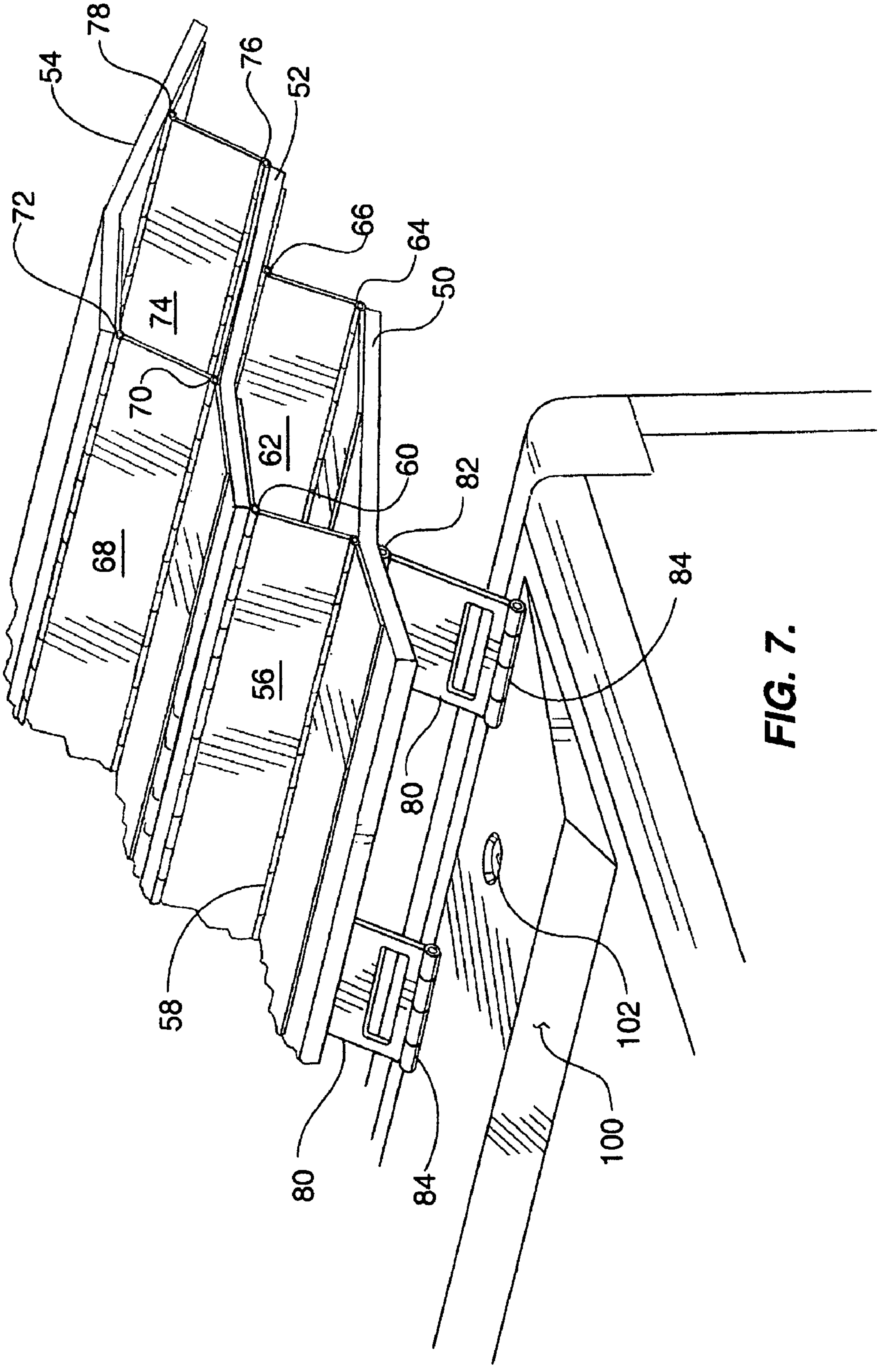
FIG. 7 is a front and top perspective view of the alternate embodiment of FIG. 5 in a partially extended position.

In another embodiment of the present invention seen in FIGS. 5-7, fixed diverter 14*a* is a spacer 100 which is mounted to vehicle 12 by bolts 102, nuts 104 and washer 106. Spacer 100 presents a flattened triangular profile from the side. Movable diverter 16*a* comprises of three diverter sections 50, 52 and 54. In the retracted position best seen in FIG. 5, the diverter sections are stacked atop of fixed diverter 14' where diverter section 50 abuts movable diverter 16, diverter section 52 abuts diverter section 50 and diverter section 54 abuts diverter section 52.

Diverter section 50 is connected to diverter section 52 by first hinge 56 which extends from a pivot 58 approximately the midpoint of diverter section 50 to a pivot 60 proximate to the front of diverter section 52. A second hinge 62 extends from a pivot 64 approximately the rear of diverter section 50 to a pivot 66 proximate to the midpoint of diverter section 52.

Diverter section 52 is connected to diverter section 54 by third hinge 68 which extends from a pivot 70 approximately the midpoint of diverter section 52 to a pivot 72 proximate to the front of diverter section 54. A fourth hinge 74 extends from a pivot 76 approximately the rear of diverter section 52 to a pivot 78 proximate to the midpoint of diverter section 54.

Diverter section 50 is connected to fixed diverter 14*a* by hinges 80 which extends from a pivot 82 proximate to the middle of diverter section 50 to a pivot 84 proximate to the rear of fixed diverter 14*a*.

In this embodiment, when vehicle 12 reaches the predetermined deployment speed, air flow begins to lift movable diverter 16*a* away from fixed diverter 14*a*. As this occurs, diverter sections 50, 52 and 54 rotate rearwardly as best seen in FIG. 7. As diverter sections 50, 52, 54 rotate, movable diverter 16*a* forms a curve which directs air flow to the rear of vehicle 12. To limit the movement of movable diverter 16*a*, a stop 90 is provided proximate to pivot 82. When movable diverter 16*a* is at full extension, stop 90 is engaged with the bottom of diverter section 50 and hinge 80 to prevent further movement. As best seen in FIGS. 5 and 6, stop 90 is secured in a stop pit 92 positioned in the top of fixed diverter 14*a* when movable diverter 16*a* is in the retracted position.

All pivots 58, 60, 64, 66, 70, 72, 76, 78, 82, 84, 86, 90 are biased to the retracted position of FIG. 5, preferably via spring tension. Thus, once vehicle 12 drops below the predetermined deployment speed, movable diverter 16' sections return to the retracted position.

Although only certain embodiments have been illustrated and described, it will be apparent to those skilled in the art that various changes and modifications may be made therein without departing from the spirit of the invention or from the scope of the appended claims.

What is claimed is:

1. An apparatus for reducing atmospheric drag on a moving vehicle, comprising:

a fixed diverter mounted on a rear portion of the vehicle; and at least one movable diverter mounted on the rear portion of the vehicle and having a retracted position and an extended position;

wherein the at least one movable diverter is biased to the retracted position and rests over the fixed diverter when in the retracted position, wherein the at least one movable diverter extends inwardly behind at least a portion of a back edge of the vehicle when in the extended position; and wherein the fixed diverter presents a triangular cross section and each of the at least one movable diverter is comprised of three diverter sections which are stacked atop the fixed diverter in the retracted position, the fixed diverter being rotatably connected to one of the diverter sections, the diverter sections being rotatably and sequentially connected to each other when deployed, the diverter sections form a curve which directs air flow to the rear of the vehicle.

2. The apparatus of claim 1 wherein the fixed diverter and the diverter sections are connected by pivotally mounted hinges.

3. The apparatus of claim 2 wherein the pivotally mounted hinges are biased to the retracted position by spring tension.

4. The apparatus of claim 1, wherein the at least one movable diverter moves to the extended position when the vehicles moves above a predetermined velocity and returns to the retracted position when the vehicles moves below the predetermined velocity.

* * * * *